United States Patent
Braun

[11] 3,888,545
[45] June 10, 1975

[54] INTEGRAL MOLDED ARTICLE HAVING THE APPEARANCE OF A TIRE AND AN INTEGRAL WHEEL-TIRE

[76] Inventor: Arthur R. Braun, 209 E. Mildred, Cary, Ill. 60013

[22] Filed: Oct. 23, 1973

[21] Appl. No.: 408,516

[52] U.S. Cl............................ 301/63 PW; 301/63 R
[51] Int. Cl.............................................. B60b 5/02
[58] Field of Search......... 301/63 PW, 64 SD, 63 R; 152/323, 324, 326; 74/230.01, 230.5, 230.7

[56] References Cited
UNITED STATES PATENTS

| | | | |
|---|---|---|---|
| 2,686,549 | 8/1954 | Henry............................ | 301/63 PW |
| 2,878,074 | 3/1959 | Cawl............................. | 301/63 PW |

*Primary Examiner*—M. Henson Wood, Jr.
*Assistant Examiner*—Reinhard J. Eisenzopf

[57] ABSTRACT

An article having the general appearance of a tire to a casual observer, and being capable of performing as a tire, and an integral molded wheel-tire article is disclosed.

The tire comprises a plurality of spaced-apart axially extending annular fins extending axially from a thin radially extending annular support. When the integral article comprising the fins and annular support is produced by an injection molding process in a mold cavity of such dimensioning that the thickness of the respective part is about one-eighth inch, very short mold cycle times are achieved, and major raw material requirement economies are also achieved. Thus, the tire and integral wheel-tire of the present invention is very economical for these and other reasons, and yet is eminently satisfactory for use in many moderate load applications even under abusive conditions.

11 Claims, 7 Drawing Figures

PATENTED JUN 10 1975 3,888,545

INTEGRAL MOLDED ARTICLE HAVING THE APPEARANCE OF A TIRE AND AN INTEGRAL WHEEL-TIRE

This invention relates to the manufacture of a tire for use on lawn mowers and the like, by injection molding. In a broader sense, it relates to the manufacture of an integral wheel-tire by injection molding, and to an integral wheel-tire structure particularly adaptable to manufacture by injection molding.

It has been suggested heretofore that wheels comprising a hub, a radially extending support portion, and a tire-receiving rim be manufactured as an integral article by injection molding processes. However, these wheels generally require the mounting thereon of a separate tire, and the mounting and other assembly costs add considerably to the eventual cost of the article to the consumer.

It has also been suggested heretofore that wheels comprising a hub, a radially extending support portion, and a tire-receiving rim be manufactured as an integral article by an injection molding process in which a relatively thin tread is integrally molded on the rim. That is, such structures have a "rim" which constitutes a tread. However, these wheels are generally unattractive, and do not present the general appearance of a wheel having a tire mounted thereon.

Injection molding of articles having the configuration of a solid tire, and of an integral wheel-tire articles have not been attractive from an economic viewpoint, inasmuch as the cycle time which is encountered in the injection molding of a plastic mass having a shape corresponding generally to a tire, or to an annular structure having the appearance of a tire, is of such duration as to render the process unattractive from a production viewpoint.

It is an object of the present invention to provide a tire structure, and an integral wheel-tire structure which can be readily manufactured by injection molding in a method in which the cycle times can be less than 1 minute, e.g., about 30 seconds or less.

It is another object of the present invention to provide an injection molded wheel-tire structure which has the general appearance of a wheel having a tire mounted thereon.

It is another object of the present invention to provide a tire structure and a structure having the appearance of, to a casual observer, a wheel with a tire mounted thereon, and which is economical to manufacture, and which involves the consumption of a minimum of plastic, thereby decreasing the unit cost due to raw material requirements.

These and other objects which will be apparent hereinafter are all achieved in accordance with the present invention, and are described herein in connection with the particularly preferred embodiment and by the aid of the accompanying drawings, in which:

FIG. 3 is a fragmentary cross-sectional view taken approximately along the line 3—3 of FIG. 1.

Figures 1, 2, 3:
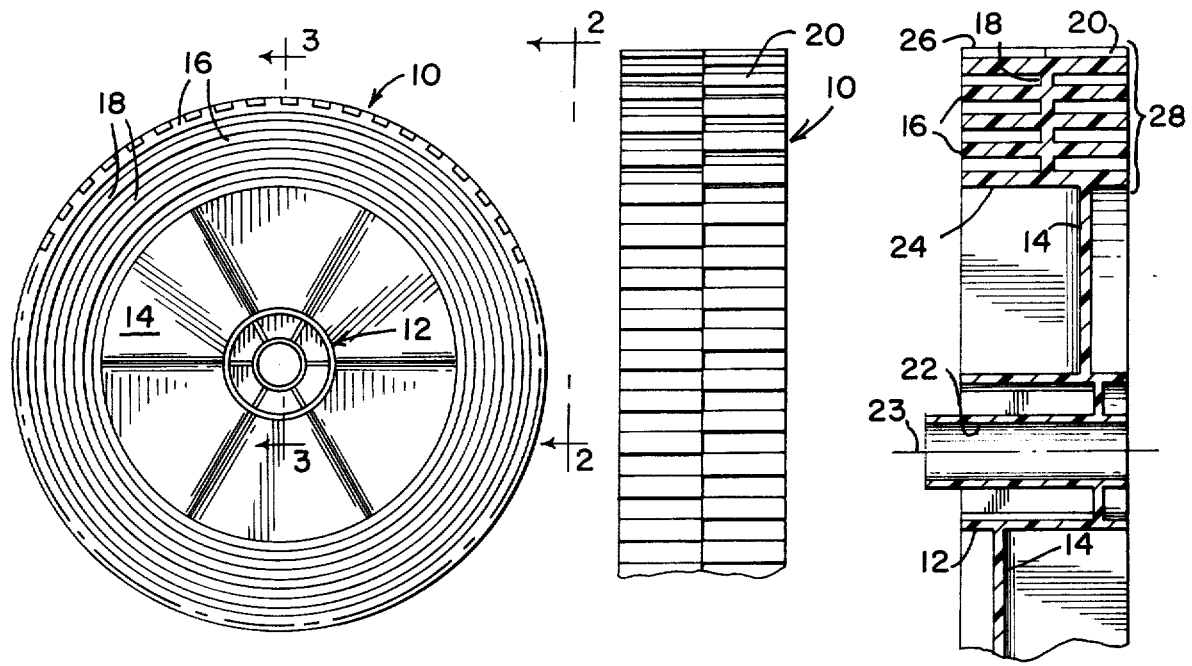
FIG. 1 is an elevational view of a wheel in accordance with the present invention, the elevational view being along the axis of the wheel.
FIG. 2 is an enlarged fragmentary view taken approximately along the line 2—2 of FIG. 1 showing an illustrative tread configuration.
FIG. 3 is a fragmentary corss-sectional view taken approximately along the line 3—3 of FIG. 1.

Referring now to the drawings, in FIG. 1 an integral tire-wheel in accordance with the present invention is generally indicated by the numeral 10. Wheel 10 comprises a hub generally indicated by the numeral 12, a serpentine radially extending middle support section 14 and a plurality of axially extending annular fins 16 extending axially in opposite directions from outer radially extending support disk 18. The outermost fin 16 can be regarded as a single annular tread 20 positioned at the outer circumference of annular radially extending disk 18. That portion 28 of a wheel-tire 10 corresponding to fins 16 and disk 18 has the appearance of a tire to a casual observer, and is the structure referred to herein as a tire 28 in accordance with this invention.

Hub 12 can be regarded as being of generally annular configuration having an axle-receiving bore 22 therethrough centered on the common axis 23 of the annular elements 12, 14, 16, 18, and 20. Center support section 14, in the embodiment illustrated in FIGS. 1-3 constitutes a radially extending portion in which all parts thereof extend along radii from axis 23 from hub 12 to the inner surface 24 of the innermost annular fin 16. The path of a point traveling around center axis 23 through central support 14 on a concentric cylinder is serpentine, in the embodiment shown in FIGS. 1-3.

In the embodiment illustrated in FIGS. 1-3, annular radially extending disk 18 is substantially centered with respect to fins 16 extending in either direction therefrom. The outermost annular fin 16 constituting tread 20 can have any desired configuration at the circumferencial surface 26, although, in accordance with the present invention, it is essential that the pattern on this surface 26 be readily formed by injection molding, with the view in mind that the mold elements must be parted, and that the resulting wheel-tire must be expeditiously removed from the mold elements.

Each of the structures referred to hereinbefore, including central support section 14, fins 16, outer annular disk 18, in accordance with the present invention, are very thin, that is, have very narrow face-to-face thickness dimensions. For example, center support section 14 is preferably about one-eighth inch thick, annular fins 16 are about one-eighth inch thick (along a radius) and outer annular disk 18 is approximately one-eighth inch thick (along an axially extending line). Generally speaking, none of these dimensions should exceed about one-fourth inch. As the term is used herein, the thickness of braces 130, 230, 132, 232, and 240 is measured along a tangent transverse to the radius and transverse to the axial direction.

A tire-wheel 10 in accordance with the present invention, has the overall appearance of a conventional wheel having a tire mounted thereon, and yet, the structure of the present invention, because of the inherent thinness of all the respective portions thereof can be manufactured by injection molding method in short cycle times less than 1 minute, e.g., 30 seconds or less. On the other hand, a conventional tire-wheel mass would correspond to the outer dimensions of the tire-wheel 10 in accordance with the present invention would require injection molding cycles of much longer duration, such as approximately 5 minutes, for example.

Moreover, because of the inherent thinness of the respective portions of the tire-wheel 10 in accordance with the present invention, the amount of plastic raw material required is very substantially reduced. Being of integral construction, the integral wheel-tire article of the present invention does not involve the tire-mounting steps or the costs of mounting and therefore has a great economical advantage. In addition, the tire-wheel 10 in accordance with the present invention is extremely economical, as compared to what could be regarded as conventional tire-wheels heretofore available, inasmuch as the cycle time is so substantially reduced, and inasmuch as the raw material requirement is also drastically reduced.

Figures 4, 5:
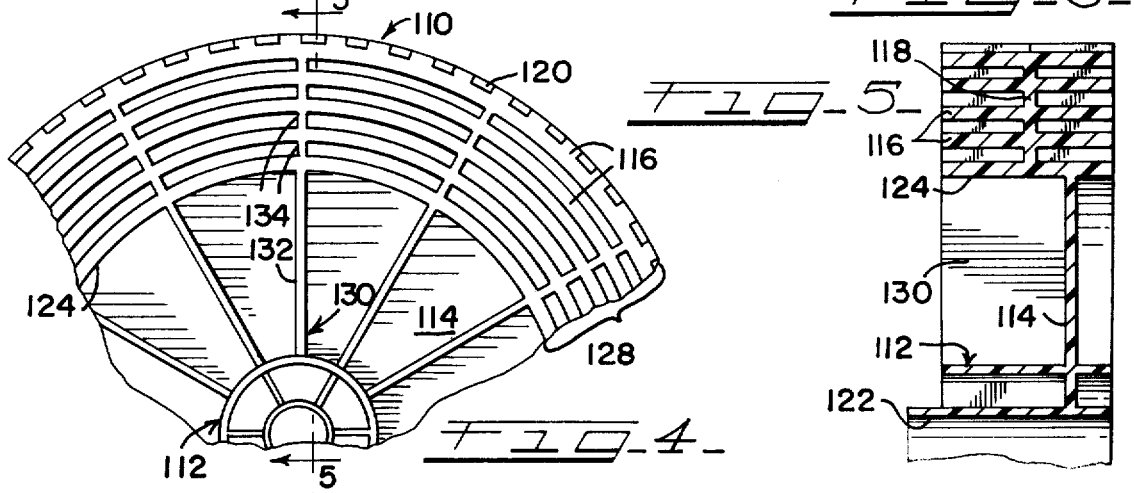
FIG. 4 is a fragmentary elevational axial view (similar to the view shown in FIG. 1) illustrating an alternative embodiment of the present invention.
FIG. 5 is a fragmentary cross-sectional view taken approximately along the line 5—5 of FIG. 4.
Figures 6, 7:
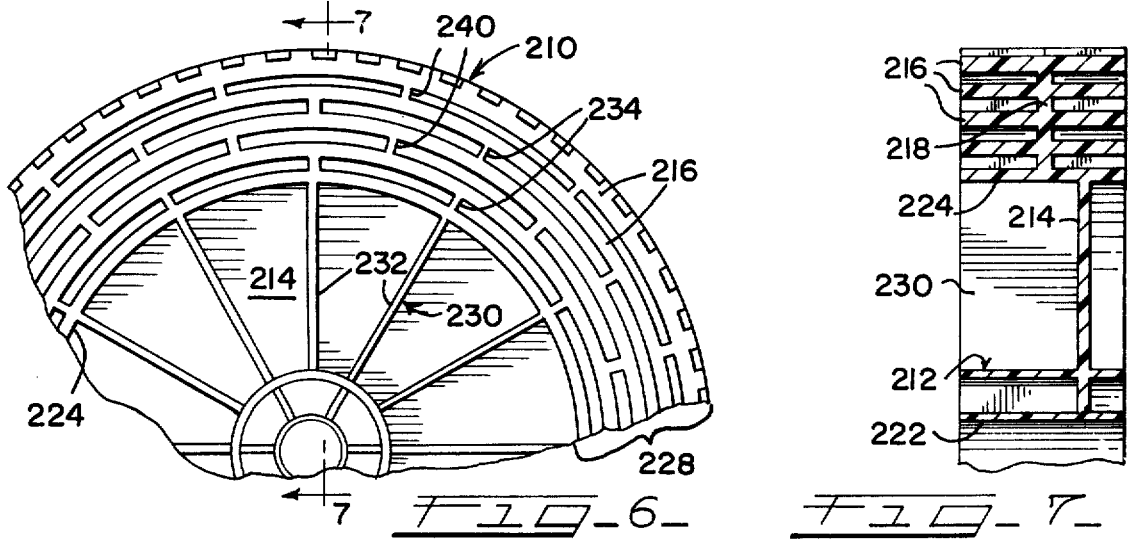
FIG. 6 is a fragmentary elevational axial view (similar to the view shown in FIG. 1) of another alternative embodiment.
FIG. 7 is a fragmentary cross-sectional view taken approximately along the line 7—7 of FIG. 6.

A first alternative embodiment is illustrated in FIGS. 4–5 and a second alternative embodiment is illustrated in FIGS. 6–7. It will be apparent that various portions of the respective structures are analogous and quite similar to certain structures described hereinbefore in connection with the embodiments shown in FIGS. 1–3. These analogous structures will be given the corresponding numbers used in FIGS. 1–3, except that, in connection with FIGS. 4 and 5, the numbers will be in the 100 series, and in the embodiment shown in connection with FIGS. 6 and 7, the numbers will be in the 200 series. Thus, for example, the tire-wheel shown in FIGS. 4 and 5 is generally indicated by the numeral 110, and the tire-wheel illustrated in FIGS. 5 and 6 is generally indicated by the numeral 210.

The alternative embodiments will be discussed individually hereinafter.

Wheel-tire 110 includes a hub generally indicated by the numeral 112, and annular radially extending disk 114 constituting a central support section, annular fins 116, and outer radially annular disk 118. The outermost fin 116 can be regarded as a tread 120. Hub 112 has a bore 122 passing therethrough. It is noted that the annular disk 114 in the central portion 114 can be regarded as being integral with annular disk 118 and as extending radially outwardly through fins 116 as annular bracing or disk 118. The structure consisting essentially of fins 116, and disk 118 is referred to herein as tire 128.

In addition to the annular disk 114 connecting hub 112 to inner surface 124 of innermost annular fin 116, the integral tire-wheel 110 includes integral radially extending and axially extending ribs generally indicated by the numeral 130. It is noted that the ribs 130 include a central portion 132 extending between hub 112 and inner surface 124, and additional aligned bracing portions 134 positioned outwardly of central portion 132 and connecting respective adjacent annular ribs 116.

In the embodiment shown in FIGS. 6 and 7, the wheel-tire structure 210 is similar to wheel-tire structure 110 inasmuch as it comprises a similar hub 210, having a bore 222 passing therethrough and having a center axis 223 with all annular elements being concentric around center axis 223, and includes annular radially extending disk 214 constituting a central support section, annular fins 216, and outer radially extending annular disk 218. It is noted that the central annular disk 214 can be regarded as being integral with annular disk 218 and as extending radially outwardly through fins 216 as annular bracing or disk 218.

As in the case of the embodiment shown in FIGS. 4 and 5 the structure 210 shown in FIGS. 6 and 7 includes, in addition to the annular radially extending disk 214, a plurality of integral radially extending and axially extending support ribs 230. It is noted that these ribs 230 include a central portion 232 extending between hub 212 and radially aligned bracing portions 234 positioned radially outwardly of central portion 232 and connecting alternate adjacent fins 216. Alternating axially extending braces 240 are offset with respect to the alignment of axially extending ribs and braces 230, 234, and are radially aligned with each other and are positioned between those adjacent ribs 216 which are not braced by and connected by braces 234.

The structure consisting essentially of fins 216, braces 234, and those braces 240 and annular radially extending disk 218, is referred to herein as tire 228.

In accordance with the preferred embodiment of the present invention, at least three fins 16, 116, 216 are employed and, preferably, a sufficient number of fins 16, 116, 216 are employed to provide a tire width (dimension in the axial direction) which is substantially the same as the tire thickness (dimension in the radial direction from the inside surface 14, 114, 214, of the inner fins 16, 116, 216 to the outside of the tread 20, 120, 220).

Tires 28, 128, 228 in accordance with the present invention have the general appearance of a solid or pneumatic tire to the casual observer, and, when the tire-wheels 10, 110, 210, in accordance with the present invention are employed in suitable applications such as, for example, lawn mowers, and the like, the structure is eminently satisfactory and, based on repeated observations to date, exhibits performance commensurate with the performance of solid tire construction.

While it is to be appreciated that even though solid tires or pneumatic tires may be regarded as required for use on wheels intended for use under certain relatively heavy load usages, it has been appreciated that many applications, particularly applications involving relatively light loads, can be served in an eminently satisfactory manner even under relatively abusive conditions by use of the novel tires 28, 128, 228, or the integral wheel-tire 10, 110, 210 in accordance with the present invention.

The preferred application of the present invention involves the manufacture of integral wheel-tire structures 10, 110, 210 by injection molding in molds having a mold cavity corresponding to the shape of the wheel-tires 10, 110, 210, and in which the respective mold elements defining the cavity are movable axially with respect to center axis lines 23, 123, 223. Nonetheless, the present invention can be utilized to provide tires corresponding to tires 28, 128, 228 for mounting on conventional rims and using conventional mounting means, which tires 28, 128, 228 can be manufactured by an economic, short cycle injection molding process, in the same type of molds as those referred to above, and provide the further economy due to minimized raw material cost.

The preferred material for use in molding tires 28, 128, 228 on integral wheel-tire articles 10, 110, 210, is stiffly resilient plastic.

I claim:

1. An integral tire and wheel combination having the general appearance and functional capability of a tire, comprising: a central hub portion, a thin radially extending annular support disc, a plurality of concentric spaced-apart fins axially extending from at least one face of said disc and being integral therewith, and means including a support member extending radially between said hub portion and said support disc for supporting said disc in spaced relation to said hub portion.

2. An integral tire and wheel combination as defined in claim 1 wherein the thickness of said fins in a radial direction is less than one-fourth inch, and the thickness of said support disc is less than one-fourth inch.

3. An integral tire and wheel combination as defined in claim 1 wherein there are at least three of said fins extending axially from each face of said support disc.

4. An integral tire and wheel combination as defined in claim 1 in which said support disc includes a plurality of braces extending axially from at least one face thereof for connecting adjacent ones of said spaced-apart fins, said axially extending braces being positioned between said fins along respective radially extending lines.

5. An integral tire and wheel combination as defined in claim 4 in which said axially extending braces are offset with respect to braces between the adjacent fins and the next fins beyond.

6. An integral tire and wheel combination as defined in claim 1 in which said support element is disc shaped and axially spaced with respect to said support disc.

7. An integral tire and wheel combination having a central hub portion, a radially extending support disc, means including a support member extending radially between said hub portion and said support disc for supporting said support disc in spaced relation to said hub, and a peripheral circumferential portion having the appearance of a tire; said peripheral portion including a plurality of concentric spaced-apart axially extending fins, and a plurality of radially extending bracing elements positioned between said fins for maintaining the concentric positioning of said fins, wherein said bracing elements and said fins have a thickness no greater than one-fourth inch.

8. An integral tire and wheel combination as defined in claim 7 in which said bracing elements comprise axially extending members extending from at least one face of said support disc, and in which said axially extending members are positioned between each of said fins along a line radially extending from said central hub portion.

9. An integral tire and wheel combination as defined in claim 8 in which said axially extending members are offset with respect to like members between the next adjacent fins and the next fins beyond.

10. An integral tire and wheel combination as defined in claim 7 in which said support member is disc shaped and axially spaced with respect to said support disc.

11. An integral tire and wheel combination as defined in claim 10 in which said support member includes a plurality of axially extending ribs extending between said hub and the innermost of said axially extending annular fins.

* * * * *